US009785253B2

(12) United States Patent
Lee

(10) Patent No.: US 9,785,253 B2
(45) Date of Patent: Oct. 10, 2017

(54) POINTING DEVICE USING CAMERA AND OUTPUTTING MARK

(71) Applicant: Moon Key Lee, Seoul (KR)

(72) Inventor: Moon Key Lee, Seoul (KR)

(*) Notice: Subject to any disclaimer, the term of this patent is extended or adjusted under 35 U.S.C. 154(b) by 151 days.

(21) Appl. No.: 14/574,879

(22) Filed: Dec. 18, 2014

(65) Prior Publication Data

US 2015/0103005 A1    Apr. 16, 2015

Related U.S. Application Data

(62) Division of application No. 13/795,749, filed on Mar. 12, 2013, now abandoned, which is a division of
(Continued)

(30) Foreign Application Priority Data

May 26, 2007 (KR) .......................... 10-2007-0051168
Aug. 10, 2007 (KR) .......................... 10-2007-0080925
(Continued)

(51) Int. Cl.
*G06F 3/033* (2013.01)
*G06F 17/00* (2006.01)
(Continued)

(52) U.S. Cl.
CPC ............ *G06F 3/0304* (2013.01); *G06F 3/033* (2013.01); *G06F 3/0317* (2013.01);
(Continued)

(58) Field of Classification Search
CPC .... G06F 3/0304; G06F 3/0317; G06F 3/0321; G06F 3/033; G06F 3/03545;
(Continued)

(56) References Cited

U.S. PATENT DOCUMENTS 7,161,596 B2    1/2007  Haile
2001/0010514 A1 8/2001  Ishino
(Continued)

FOREIGN PATENT DOCUMENTS

CN    2004/80012362.7    6/2006
FR          2812955      2/2002
(Continued)

OTHER PUBLICATIONS

Decision of Refusal dated Feb. 19, 2015 in corresponding Japanese Application No. 2012-158455.
(Continued)

*Primary Examiner* — Amit Chatly
(74) *Attorney, Agent, or Firm* — Nixon & Vanderhye, PC

(57) ABSTRACT

Pointing device like mouse or joystick comprises camera for capturing the display screen and image processing means for recognizing and tracking the pointing cursor icon or mark from the captured image and producing the pointing signal. The pointing device of present invention can be used with any type of display without and additional tracking means like ultra sonic sensor, infrared sensor or touch sensor. The pointing device of present invention includes mark outputting portion, camera portion for capturing the said mark outputting portion and image processing portion for recognizing the said mark outputting portion from the captured image and producing the pointing signal.

4 Claims, 6 Drawing Sheets

Related U.S. Application Data application No. 12/526,527, filed as application No. PCT/KR2008/002913 on May 25, 2008, now abandoned.

(30) Foreign Application Priority Data

| Sep. 19, 2007 | (KR) | .......................... 10-2007-0095580 |
| Sep. 30, 2007 | (KR) | .......................... 10-2007-0098528 |
| May 5, 2008 | (KR) | .......................... 10-2008-0041623 |

(51) Int. Cl.

| G06F 3/03 | (2006.01) |
| G06F 3/0354 | (2013.01) |
| G06F 3/038 | (2013.01) |
| G06K 9/22 | (2006.01) |
| G06K 9/62 | (2006.01) |
| H04N 5/225 | (2006.01) |

(52) U.S. Cl.
CPC .......... G06F 3/0321 (2013.01); G06F 3/0386 (2013.01); G06F 3/03545 (2013.01); G06K 9/222 (2013.01); G06K 9/62 (2013.01); H04N 5/2252 (2013.01); *G06K 2009/226* (2013.01)

(58) Field of Classification Search
CPC ........ G06F 3/0386; G06K 9/222; G06K 9/62; G06K 2009/226; H04N 5/2252
USPC .................................................. 345/156–163
See application file for complete search history.

(56) References Cited

U.S. PATENT DOCUMENTS

| 2006/0197742 A1 | 9/2006 | Gray, III |
| 2007/0225072 A1* | 9/2007 | Xing .................... A63F 13/04 463/30 |
| 2007/0236451 A1 | 10/2007 | Ofek et al. |
| 2008/0062124 A1 | 3/2008 | Kim et al. |
| 2010/0103099 A1 | 4/2010 | Lee |

FOREIGN PATENT DOCUMENTS

| JP | 7-121293 | 5/1995 |
| JP | A-7-141104 | 6/1995 |
| JP | A-7-234755 | 9/1995 |
| JP | 11-085395 | 3/1999 |
| JP | A-2001-224856 | 8/2001 |
| JP | A-2001-325069 | 11/2001 |
| JP | 2002-222043 | 8/2002 |
| JP | A-2003-122505 | 4/2003 |
| JP | A-2003-280813 | 10/2003 |
| JP | A-2004-171414 | 6/2004 |
| JP | A-2005-500590 | 1/2005 |
| JP | A-11-2005-52306 | 3/2005 |
| JP | A-2005-258694 | 9/2005 |
| JP | A-2007-114820 | 5/2007 |
| JP | 2007-257438 | 10/2007 |
| JP | 2010-510205 | 5/2008 |
| KR | 10-0532525 | 11/2003 |
| KR | 10-0708875 | 4/2007 |
| WO | WO 02/065388 A2 | 8/2002 |
| WO | 2004/090706 A2 | 10/2004 |
| WO | WO/2005/013115 A1 | 10/2005 |

OTHER PUBLICATIONS

Office Action issued in Jasanese Patent Application No. 2015-120124.

International Search Report for PCT/KR2008/002913 dated Dec. 9, 2008.

The Office Action dated May 25, 2011 of Chinese Patent Appln. No. 200880017306.0.

Office Action dated Sep. 29, 2011 of JP Patent Appln. No. 2010-510205.

Japanese Office Action dated Oct. 15, 2013 for Japanese Patent Application No. 2012-158455 (with English-language translation).

Japanese Office Action dated Jun. 2, 2014 issued in Japanese Patent Application No. 2012-158455 (with translation).

\* cited by examiner

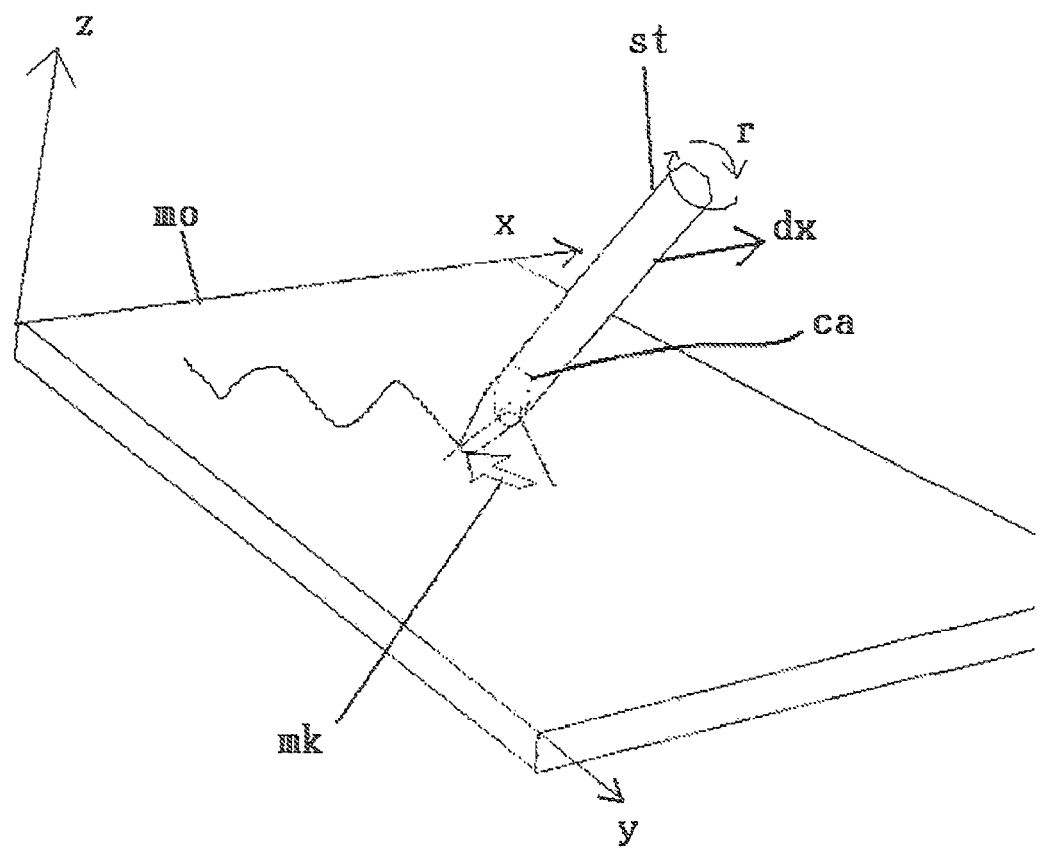
[Fig. 1]

[Fig. 2]
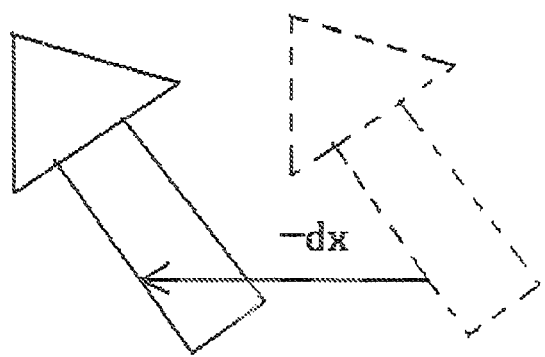

[Fig. 3]
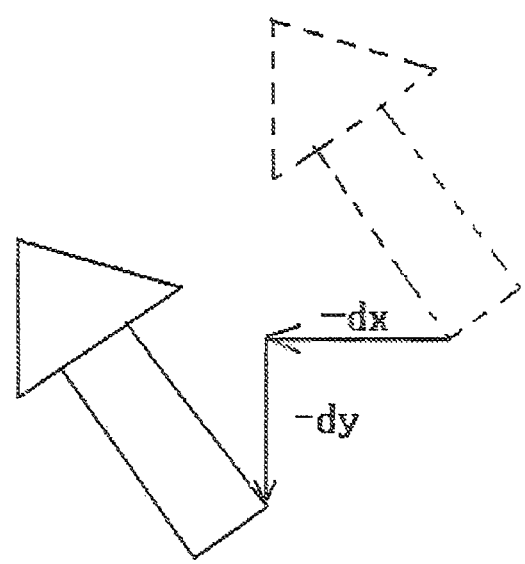

[Fig. 4]
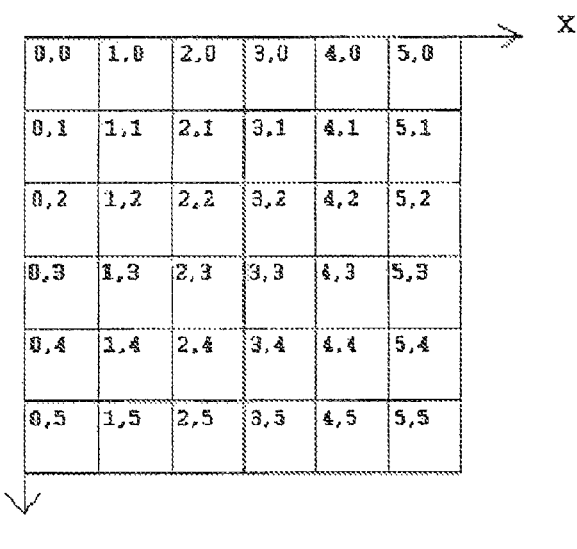
[Fig. 5]
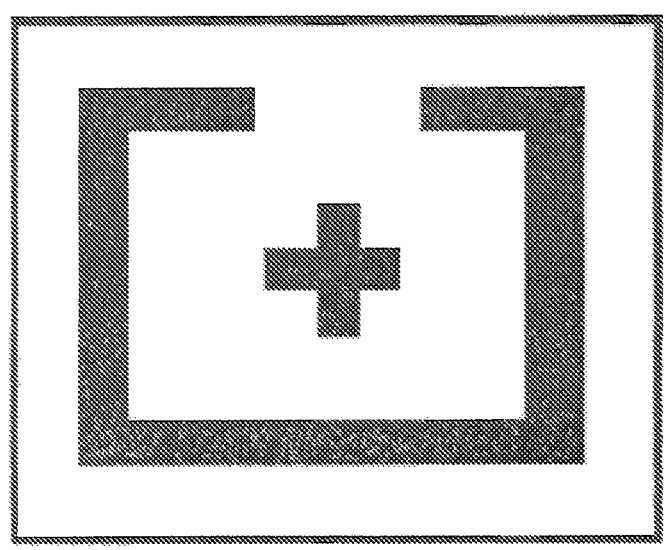

[Fig. 6]
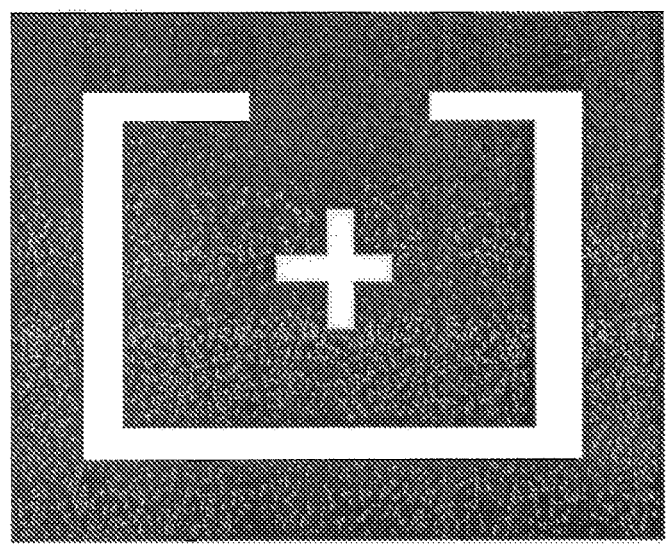

[Fig. 7]
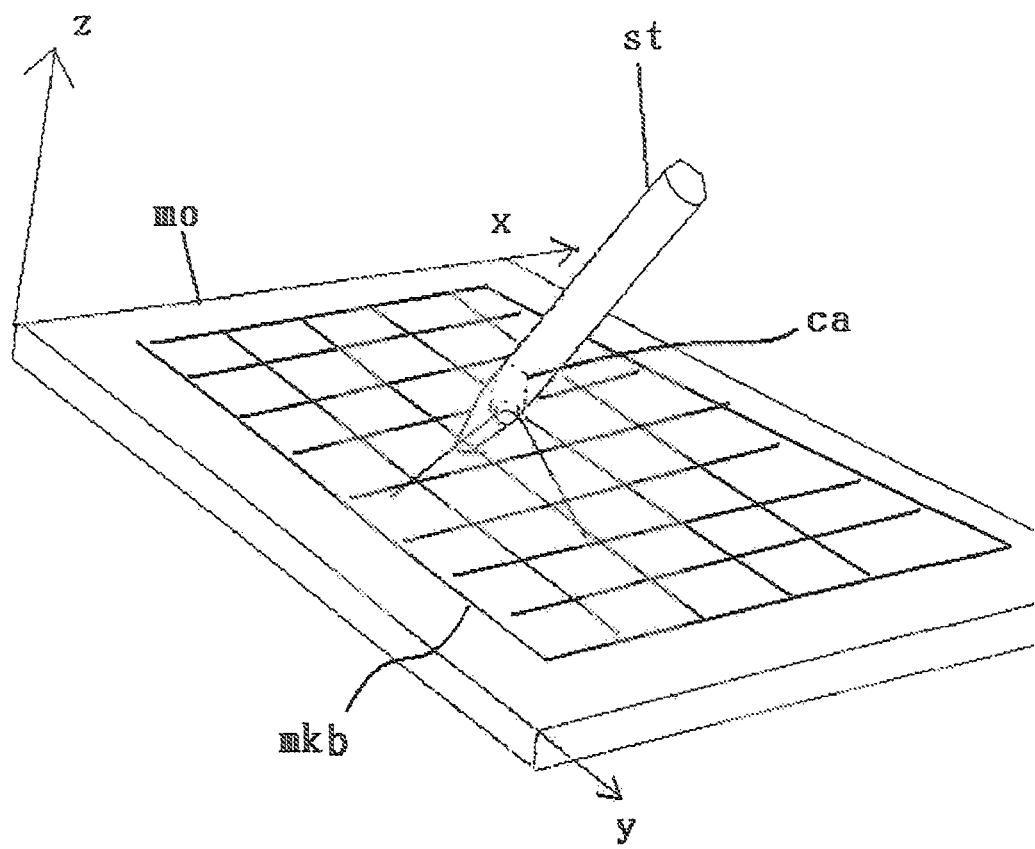

POINTING DEVICE USING CAMERA AND OUTPUTTING MARK

This application is a divisional of application Ser. No. 13/795,749 filed on Mar. 12, 2013, which in turn is a divisional of application Ser. No. 12/526,527 filed on Aug. 10, 2009 which is the U.S. national phase of International Application No. PCT/KR2008/002913 filed 25 May 2008 which designated the U.S. and claims priority to Korean Patent Application Nos. 10-2007-0051168 filed 26 May 2007, 10-2007-0080925 filed 10 Aug. 2007, 10-2007-0095580 filed 19 Sep. 2007, 10-2007-0098528 filed 30 Sep. 2007 and 10-2008-0041623 filed 5 May 2008, the entire contents of each of which are hereby incorporated by reference.

TECHNICAL FIELD

The present invention relates to the pointing device like mouse or joystick with camera for capturing the image of display like PC monitor and image processing means for recognizing and tracking the icon of pointing cursor or mark. The pointing device of present invention can be used in the form of TV remote controller or digital stylus pen. There is the similar invention (Korean patent 10-0532525-0000, 3 dimensional pointing device using camera). The said similar invention has the problem that it requires the optical mark (light source like infrared LED) attached on the display to be captured by camera and the pointing device of electronic blackboard has the problem that it requires the ultra sonic sensor or infrared sensor. The pointing device of PDA or tablet PC has the problem that they requires the pressure sensor or touch sensor. It is difficult for the portable flexible thin film display like OLED to adopt such conventional heavy and volumetric sensor systems on it.

DISCLOSURE OF INVENTION

Technical Problem

To solve the problem, it is an object of present invention to provide a pointing device which does not require any sensor system (like infrared LED, ultra sonic sensor, infrared sensor and pressure sensor) attached on the display.

Technical Solution

The present invention provides the pointing device which uses the cursor icon or pattern displayed on screen as a mark instead of physical mark like infrared light source or ultra-sonic source.

Advantageous Effects

By using the pointing device of present invention, it is possible to move the pointing cursor like the mouse or joystick cursor without attaching physical sensor system or tracking mark on display including flexible display like OLED.

BRIEF DESCRIPTION OF THE DRAWINGS

FIG. 1 is the embodiment of the present invention as tablet PC and pen camera.
FIG. 2 is the arrow mark moving in left direction.
FIG. 3 is the arrow mark moving in left and bottom direction.
FIG. 4 is the 2 dimensional array of cell of display.
FIG. 5 is an example of mark image.
FIG. 6 is the negative image of FIG. 5.
FIG. 7 is the display which is outputting mark image of 2 dimensional array of cell of pattern.

SYMBOLS IN DRAWINGS mo: monitor, mk: mark
ca: camera st: stylus pen
r: rotation of stylus pen
mkb: mark image of 2 dimensional array of cell of pattern

BEST MODE FOR CARRYING OUT THE INVENTION

Embodiment 1

The pointing device of present invention includes mark outputting portion like conventional display (computer monitor, TV monitor, beam-projected screen), camera portion for capturing the said mark outputting portion and image processing portion which recognizes the mark from the captured image and produces the pointing signal. The appearance of camera portion can be a remote controller for digital TV, stylus pen for tablet PC or gun controller for shooting game. The image processing portion can be image processing program in DSP (digital signal processor), microcontroller or computer. The mark can be the conventional mouse cursor of arrow shape, or any type of pattern like +, hand, or some user defined icon for game. There is no limit on size, shape and color of the mark if the mark is recognizable by the image processing portion. FIG. 1 shows the pointing device of present invention which is pen type camera (ca) on the display (mo) of tablet PC. The camera captures the mark (mr) which is the arrow icon (mk) on the display like the conventional mouse cursor icon of Microsoft Windows. The captured images (motion video) are transferred to the image processing portion which recognizes the mark and produces the pointing signal. In order to do the pointing job, Firstly, the user must move the pen camera onto the cursor icon of display so that the cursor icon can be captured by the pen camera. And if the user moves the pen camera by writing character or drawing polygon on the display then the position of the mark in the captured image moves from the center of the image to the boundary of the image and the movement (in other words, motion vector) of the mask in the captured image can be recognized by the image processing portion by comparing the previous frame image and current frame image. The image processing portion transfers the detected motion vector to the mark outputting portion and the the mark outputting portion produces the control signal to move back the mark (cursor icon) to the center of the captured image so that the mark follows the movement of pen camera. For example, if the pen camera in FIG. 1 is moved in x direction (dx) then the mark in the captured image moves in −x direction (−dx) as shown in FIG. 2 where the x direction is horizontal and the y direction is vertical as shown in FIG. 1. Then the image processing portion produces signal so that the mark outputting portion can increase the x coordinate of the mark where the amount of the increment is proportional to the distance between the center of the captured image and the position of the mark in the captured image. In other words, the image processing portion finds the motion vector of the mark in the captured image and the mark outputting portion changes the coordinate of the mark in the negative direction of the found motion vector. In Microsoft Windows, such a moving of cursor can be controlled by using the Windows API (application program interface) which can read and change the coordinate of mouse cursor. If the mark in the captured image is located in the center of the captured image then the motion vector is zero vector and there is no change of position of the mark. FIG. 3 shows the motion vector of mark from the dotted arrow in the previous frame to the solid arrow in the current frame. By recognizing the size and distortion of shape of mark, 3 dimensional pointing is also possible. For example, the smaller mark means the larger distance between pen camera and the display and the larger mark means the smaller distance between pen camera and the display. Such a size information of mark can be used as the another coordinate (z) of mouse cursor (x,y). The direction of the mark in the captured image also can be used as another coordinate (rotation angle r in FIG. 1). The viewing direction of pen camera can be detected and used as pointing signal by recognizing the distortion of the mark which contains feature points like vertex of rectangle and triangle. Such a distortion analysis and calculating the relative direction between camera and feature points is well known technology as the perspective n point problem in image processing technology and the detail description can be found in http://homepages.inf.ed.ac.uk/rbf/CVonline/LO-CAL_COPIES/MARBLE/high/pia/solving.htm If the mark is out of viewing direction of the pen camera then the image processing portion can not detect the mark from the captured image and the movement of the mark is stopped. In order to continue the pointing procedure, user must carry the pen camera to the mark and change the viewing direction of the pen camera so that the mark can be captured by the pen camera. By adding the reset button to the pen camera, such a carrying action can be removed. If the user presses the reset button then the mark changes its position. More specifically, the mark outputting portion sequentially changes the position of mark as shown in FIG. 4 by the trigger signal of the reset button. The mark moves horizontally from (0.0) to (5.0) and
from (0.1) to (5.1) and
from (0.2) to (5.2) and
from (0.3) to (5.3) and
from (0.4) to (5.4) and and finally from (0.5) to (5.5). In other words, the mark scans all the cells sequentially. If the mark image is captured and recognized by the image processing portion during the scanning, the scanning is stopped at that time and the pointing procedure is started. The 6×6 cells of the display in FIG. 4 is an example and the real number of cells must be adjusted for a given display and camera. It is recommended to move the mark fast and use the fast camera so that the human eye can not recognize the scanning.

Mode for the Invention

Embodiment 2

The above embodiment 1 is the pen camera which is used by touching the display. If the camera is far from the display then the captured mark is too small to be recognized. In such a case, it is recommended to use the auto focusing system of camera and telescope lens or zoom lens with camera. By using such a optical apparatus, it is possible to use the pointing device of present invention as the electronic pen for tablet PC and remote controller for digital TV.

Embodiment 3

The mark in the above embodiment 1 is fixed pattern but in this embodiment the mark is the whole image of display and the distance between the camera and the display must be adjusted so that the whole image of display can be captured. The mark outputting portion includes the image transferring portion which transfers the image of display to the image processing portion. The image processing portion finds the display region from the captured image by comparing the sub regions of the captured with the transferred image of display (It is known as the model based vision). In Microsoft Windows XP, pressing the Print Screen Sys Rq key of computer keyboard captures the image of display and stores the image into the clipboard. Such an image transferring can be done by software by emulating the pressing the key or by using device driver. The image transferring portion can also be implemented by hardware. The image processing portion finds feature points from the found display and the relative distance and the direction between camera and the display can be obtained by using the formula of the perspective n point problem and such a distance and the direction information can be use to produce the pointing signal. Korean patent 10-0532525-0000 is the 3 dimensional pointing device by analyzing the feature points of rectangle. The pointing device of present invention selects the feature points from the image of display in real time and the feature points is not fixed for each frame. The model based vision is the technology to find the correspondence between the known model (transferred image of display) and given image (captured image by camera) and is published in chapter 18 of Computer vision a modern approach by David A. Forsyth and Jean Ponce (ISBN: 0-13-085198-1).

Embodiment 4

If the background of the display is simple (for example, the beam projected onto the white wall), then the detecting the display region from the captured image is simple procedure but if the background of display is not simple then the detecting the region of display from the captured image is not so simple. In order to easily detect the display region iron the captured image, the flicker generating portion can be added to the mark outputting portion of embodiment 3 and the difference image calculating portion can be added to the image processing portion of embodiment 3. More specifically, the mark outputting portion outputs the blank image for every even frames (0, 2, 4, . . . ) and outputs normal image for every odd frames (1, 3, 5, . . . ). (such odd and even frame is an example and in real implementation it is possible to use 0, 4, 8, . . . as even frames and 1, 2, 3, 5, 6, 7, . . . as odd frames, in other word the frame frequency can be adjusted in real implementation.) The blank image means the image whose all the pixels have the same brightness and color. It is recommended to keep the frame rate (number of frame per second) of display large so that the human eye can not recognize the flicker and to keep the frame rate of camera also large so that the camera can capture the even and odd frame of display. The image processing portion obtains the difference image between the captured image of previous frame and the captured image of currant frame. The difference image is well known concept in image processing technology whose pixel value defined as the difference of two corresponding pixels of two images. (The two corresponding pixels of two images means that the (x,y) positions of two pixels are the same.) The non zero pixels of the difference image calculated by the image processing portion corresponds to the flickering display region and the zero pixels of the difference image corresponds to the background of display (non flickering region). In other words, the flickering display can be detected by calculating the difference image and selecting non zero pixels from the difference image. In real world, edge lines of background of display may corresponds to the non zero pixels if the camera is not fixed but such non zero pixels can be minimized by using high speed flickering frequency and high speed camera. The regions of non zero pixels of difference image are the candidates for the flickering display region in captured image and the more exact region of display can be determined by the model based vision than embodiment 3. The found region of display can be compared with the transferred image of display and pointing signal can be generated like the embodiment 3.

Embodiment 5

The blank image for every even frames (0, 2, 4, . . . ) of embodiment 4 can be replaced by recognizable pattern (mark) and the image processing portion can recognize the pattern by analyzing the captured image of only even frame. FIG. 5 shows the example of the pattern (mark) which contains the opened rectangle and + the center of the rectangle. The + mark represents the center of mark and the rectangle can be use for 3 dimensional pointing. There is no limitation to the size, shape and color of pattern. For example, polygon, line, bar code, alphabet and number can be such a pattern. Recognizing character is well known technology as OCR (optical character recognition).

Embodiment 6

The recognizable pattern of the embodiment 5 can be splited into image of pattern and negative image of the said image of pattern. If the mark outputting portion outputs the pattern image (for 0, 3, 6, . . . frames), the negative pattern image (for 1, 4, 7, . . . frames) and the normal image for (2, 5, 8, . . . frames) sequentially and repeatedly at enough high frequency, then human eye can not recognize the pattern image but can recognize only the normal image because the pattern and its negative pattern are time-averaged out. But high speed camera can capture the pattern image and can be recognized by image processing portion. FIG. 5 and FIG. 6 are the example of the pattern image and its negative image.

Embodiment 7

The mark image of the embodiments 4~6 be 2 dimensional array of patterns where the each pattern represents the 2 dimensional position (x,y) of display. The pattern can be 2 dimensional bar code or number. FIG. 7 shows the 2 dimensional array of cells where each cell contains pattern. The reset button of embodiment 1 can be removed by adopting such cells of pattern as the mark image with pen type camera. The captured image of pattern in cell can be recognized by image processing portion and can be translated into 2 dimensional position (x,y) which is corresponding to the pointing signal. There is similar invention PCT/US1999/030507 which presents the mouse for outputting absolute coordinate with special pad where the pad contains patterns and can be recognized by the camera in mouse. There is no difference between current embodiment and the embodiment 5~6 except the mark. There is no limit on pattern in cell. The pattern can be alphabet, number, 2 dimensional bar code. By including rectangle into pattern and recognizing it, it is possible to generate 3 dimensional pointing signal by the formula of perspective n point problem.

The invention claimed is:

1. A pointing device comprising:
 a mark outputting portion for displaying a mark on a monitor; a camera portion for capturing an image of the mark; and an image processing portion for recognizing the mark from the captured image and generating a pointing signal based on the recognized mark, wherein the mark outputting portion outputs a mark image, a negative color image of the mark image and the normal image repeatedly, and the image processing portion detects the mark from the captured image from at least one of the mark image and the negative color image and generates the pointing signal determined by a position of the mark in the captured image.

2. The pointing device of claim 1, wherein
 the mark image and the negative color image are sequentially output so that the mark is not invisible to human eyes.

3. The pointing device of claim 1, wherein
 the image processing portion detects the mark by selectively using the captured image from the mark image.

4. A non-transitory computer-readable recording medium having stored thereon a computer program for executing a pointing method, wherein the pointing method comprising:
 outputting a mark image, a negative color image of the mark image and the normal image sequentially and repeatedly;
 capturing an image from at least one of the mark image and the negative color image;
 recognizing a mark from the captured image and generating a pointing signal based on the recognized mark.

* * * * *